United States Patent Office 2,809,719
Patented Oct. 15, 1957

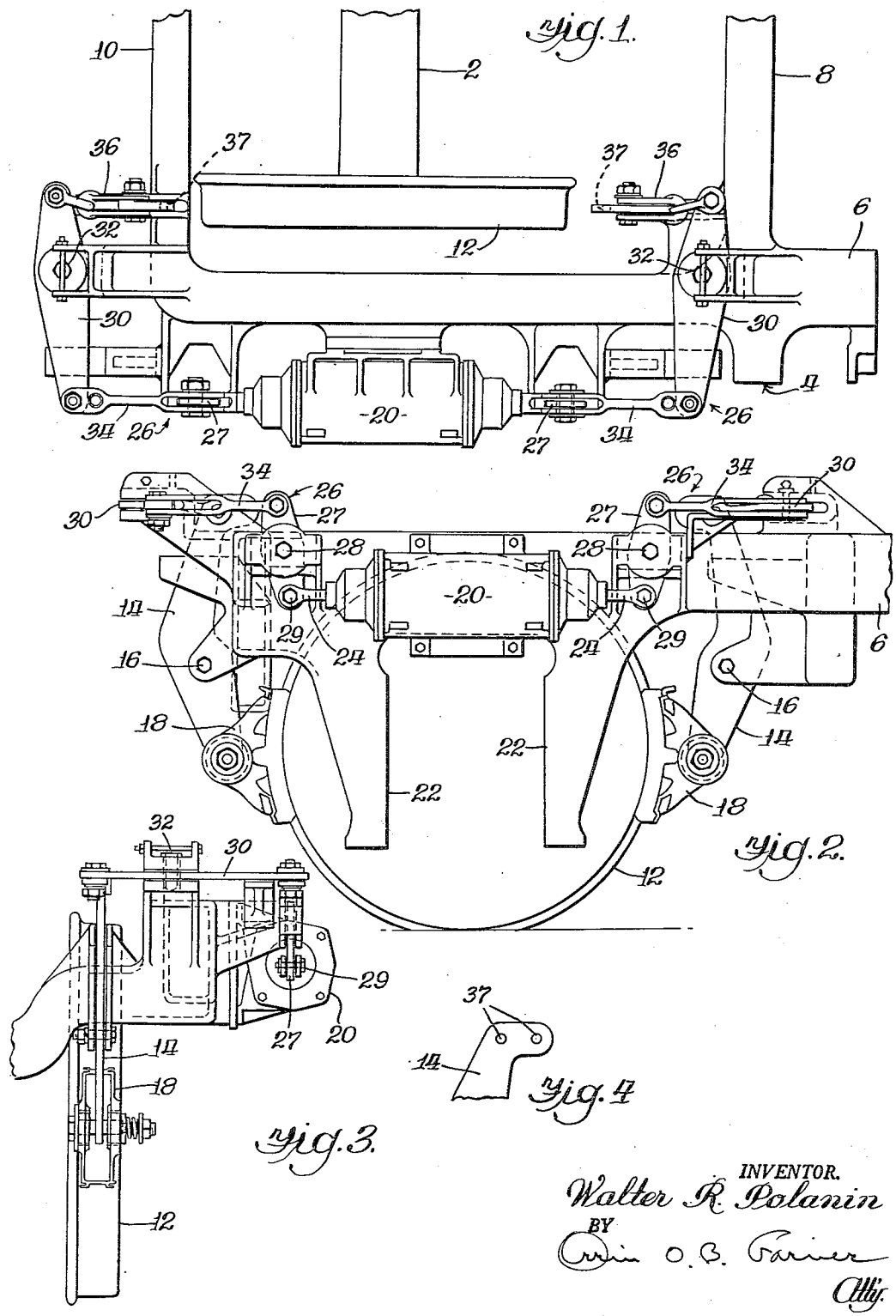

2,809,719

CLASP BRAKE

Walter R. Polanin, Chicago, Ill., assignor to American Steel Foundries, Chicago, Ill., a corporation of New Jersey Application November 4, 1953, Serial No. 390,230

2 Claims. (Cl. 188—56)

The invention relates to railway car truck brakes and in particular to that type of brake known as the clasp brake.

It is a primary object of the invention to provide a novel clasp brake affording equal braking pressures at both shoes on a given wheel.

It is a further object of the invention to provide a duplex cylinder brake arrangement that will be effective as a single shoe brake upon failure of one of the shoes of the clasp brake arrangement.

It is another object of the invention to utilize a duplex cylinder in a clasp brake arrangement.

It is yet another object of the invention to provide a clasp brake arrangement wherein all actuating levers interconnecting the brake lever and the actuating cylinder are dead levers, thereby assuring equal pressure on both shoes.

These and other objects of the invention will become apparent from a consideration of the attached specification and the drawings, wherein:

Figure 1 is a fragmentary plan view of one-quarter of a railway car truck embodying the invention, Figure 2 is a fragmentary side elevational view of the important features of the invention shown in Figure 1, Figure 3 is an end elevational view taken from the left of Figure 2, and Figure 4 is a fragmentary side elevational view of a portion of the brake lever illustrated in Figure 2.

Describing the invention in detail, a wheel and axle assembly is indicated generally at 2. A frame 4 is resiliently supported (not shown) by the assembly in the conventional manner as is well understood by those skilled in the art. The frame 4 comprises side rails 6 and interconnecting transverse members 8 and 10, the transverse member 10 constituting an end rail interconnecting the adjacent ends of the side rails 6. The wheel 12 of the assembly 2 is disposed intermediate the transverse members 8 and 10 and adjacent the side rails 6. Brake levers 14, 14 are fulcrumed intermediate their ends from the frame 4 as at 16, 16 and disposed to embrace the wheel 12 of the assembly 2. Brake head-brake shoe assemblies 18, 18, of conventional design, are pivotally carried on the lower extremities of the brake levers 14, 14, said assemblies being disposed to engage the tread on opposite sides of the wheel 12.

A duplex actuating cylinder 20 is mounted on the frame 4 on the outboard side thereof in any convenient manner, said cylinder 20 being preferably located in vertical alignment with the rotational axis of the wheel and axle assembly 2 and above the depending pedestal jaws 22, 22 of the frame 4. Piston rods 24, 24 extend from opposite sides of the cylinder 20, said piston rods being movable horizontally in response to actuation of the cylinder 20, said actuation being accomplished in any conventional manner such as by high pressure air being directed to the cylinder as is well understood by those skilled in the art. A brake linkage indicated generally at 26 is provided to operatively connect the outboard extremities of each piston rod 24 with the related adjacent brake lever 14. Each brake linkage comprises a plurality of dead levers, one of which is pivotally attached to the frame as at 28 and is generally movable in a vertical plane. The lower end of the lever 27 is pivotally attached as at 29 to the extremity of the related piston rod 24. Another dead lever 30 is provided for each linkage and is disposed to generally overly the frame 4 and is pivoted thereto intermediate its ends as at 32. The lever 30 is actuable in a horizontal plane and has its outboard extremity link connected, as at 34, to the upper extremity of the vertical dead lever 27. The inboard extremity of each horizontal lever 30 is operatively connected via the link or clevis 36 to the upper extremity of the related brake lever 14.

It should be noted that the upper ends of the brake levers 14 are provided with pin holes 37 inboardly of the holes to which the links 36 are shown connected. Thus the links 36 may be connected to the holes 37 to provide adjustment for the position of the brake levers 14 upon wear in the associated brake shoe assemblies 18.

In operation of the braking arrangement upon actuation of the cylinder 20 each piston rod 24 is urged horizontally and outwardly of the cylinder 20. Movement of each piston rod 24 outwardly causes the related vertical dead lever 27 to pivot about the horizontal axis 28, whereby the link connected dead lever 30 is urged to pivot about its axis 32. Movement of the horizontal levers 30, 30, about their pivotal axes urges the connected brake levers 14 to pivot about their axes 16 whereby the brake shoe assemblies 18 are urged inwardly toward the rotational axis of the wheel and axle assembly and thereby are urged to engage the tread of the wheel 12.

I claim:

1. In a clasp brake arrangement for a railway car truck, a wheel and axle assembly, a frame supported thereby, a duplex cylinder rigidly mounted on the frame outboardly of the assembly and in vertical alignment with the axis of rotation of said assembly, horizontally movable piston rods extending from opposite sides of the cylinder for simultaneous movement toward and away from each other, cylinder levers pivoted intermediate their ends to the frame on each side of the cylinder, said cylinder levers extending generally vertically and having their lower ends pivotally attached to the related piston rods, horizontal levers pivoted to the frame on opposite sides of the assembly, links connecting the outboard end of the horizontal levers and the related upper ends of the first mentioned levers, brake levers pivoted to the frame intermediate their ends and carrying on the lower ends thereof brake shoes engageable with diametrically opposed portions of the wheel, said cylinder levers and brake levers being disposed to rotate in parallel vertical planes located on opposite sides of the frame, the pivotal axes of said cylinder levers being disposed between the cylinder and respective transverse vertical planes defined by the pivotal axes of the respective brake levers, and other links interconnecting the upper ends of the brake levers with the inboard ends of the related horizontal levers, said brake arrangement being operative to apply equal braking pressure on both brake shoes.

2. In a brake arrangement for a railway car truck, a wheel and axle assembly, a frame supported thereby, a dead brake lever pivoted to the frame and carrying a shoe on the lower end thereof, said shoe being engageable with the wheel, a cylinder on the outboard side of the frame, a piston extending from the cylinder and movable horizontally longitudinally of the frame, a lever pivoted to the outboard side of the frame intermediate the ends thereof on a horizontal axis, said lever having its lower end directly connected to the rod, another dead lever horizontally overlying the frame and pivoted thereto, a link connecting the upper end of the second mentioned lever and the outboard end of the horizontal lever, and another connection between the inboard end of the horizontal lever and the brake lever, said brake lever being provided at its upper end with a plurality of pin holes operable to afford a plurality of selectable positions for connection between the brake lever and the related actuating lever to accommodate use of the arrangement with different wheels of varying diameters.

References Cited in the file of this patent

UNITED STATES PATENTS

| 2,191,138 | Baselt | Feb. 20, 1940 |
| 2,550,733 | Tack et al. | May 1, 1951 |

FOREIGN PATENTS

| 35,707 | Netherlands | June 15, 1935 |